United States Patent
Eda et al.

(10) Patent No.: US 12,537,025 B2
(45) Date of Patent: Jan. 27, 2026

(54) METHOD FOR MANUFACTURING MAGNETIC DISK, MAGNETIC DISK, AND MAGNETIC DISK PRECURSOR

(71) Applicants: HOYA CORPORATION, Tokyo (JP); HOYA GLASS DISK VIETNAM II LTD., Yen My (VN)

(72) Inventors: Shinji Eda, Yen My (VN); Kenichi Nishimori, Milpitas, CA (US)

(73) Assignees: HOYA CORPORATION, Tokyo (JP); HOYA GLASS DISK VIETNAM II LTD., Hung Yen Province (VN)

( * ) Notice: Subject to any disclaimer, the term of this patent is extended or adjusted under 35 U.S.C. 154(b) by 0 days.

(21) Appl. No.: 18/259,773

(22) PCT Filed: Dec. 28, 2021

(86) PCT No.: PCT/JP2021/048744
§ 371 (c)(1),
(2) Date: Jun. 28, 2023

(87) PCT Pub. No.: WO2022/145445
PCT Pub. Date: Jul. 7, 2022

(65) Prior Publication Data
US 2024/0062779 A1    Feb. 22, 2024

Related U.S. Application Data

(60) Provisional application No. 63/131,574, filed on Dec. 29, 2020.

(51) Int. Cl.
*G11B 5/84* (2006.01)
*G11B 5/73* (2006.01)
*G11B 5/82* (2006.01)

(52) U.S. Cl.
CPC ............. *G11B 5/84* (2013.01); *G11B 5/73* (2013.01); *G11B 5/82* (2013.01)

(58) Field of Classification Search
CPC ............. G11B 5/84; G11B 5/73; G11B 5/82
See application file for complete search history.

(56) References Cited

U.S. PATENT DOCUMENTS

2004/0013062 A1*  1/2004  Hino ................ G11B 20/1258
2008/0254322 A1   10/2008  Klemmer et al.
(Continued)

FOREIGN PATENT DOCUMENTS

| | | |
|---|---|---|
| CN | 103680524 A | 3/2014 |
| JP | 2001-126228 A | 5/2001 |

(Continued)

OTHER PUBLICATIONS

Translation of the International Search Report mailed on Mar. 15, 2022.

*Primary Examiner* — Kelly M Gambetta
(74) *Attorney, Agent, or Firm* — Global IP Counselors, LLP

(57) ABSTRACT

A magnetic disk used in a hard disk drive device includes a substrate; a magnetic recording layer; and a heat insulating layer provided between the substrate and the magnetic recording layer. Even though a substrate has low heat resistance, as a result of providing the heat insulating layer, the substrate can be used as a substrate for a magnetic disk that can withstand heat treatment (high-temperature annealing).

6 Claims, 1 Drawing Sheet

(56) References Cited

U.S. PATENT DOCUMENTS

| | | | |
|---|---|---|---|
| 2008/0261081 A1* | 10/2008 | Lee | G11B 5/736 428/846.9 |
| 2014/0064047 A1 | 3/2014 | Niwa et al. | |
| 2015/0027053 A1 | 1/2015 | Lin et al. | |

FOREIGN PATENT DOCUMENTS

| | | |
|---|---|---|
| JP | 2008-071455 A | 3/2008 |
| JP | 2008-269768 A | 11/2008 |
| JP | 2010-153012 A | 7/2010 |
| JP | 2014-149898 A | 8/2014 |

\* cited by examiner

[Fig. 1]
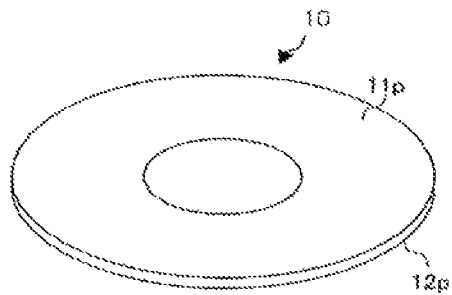
[Fig. 2]
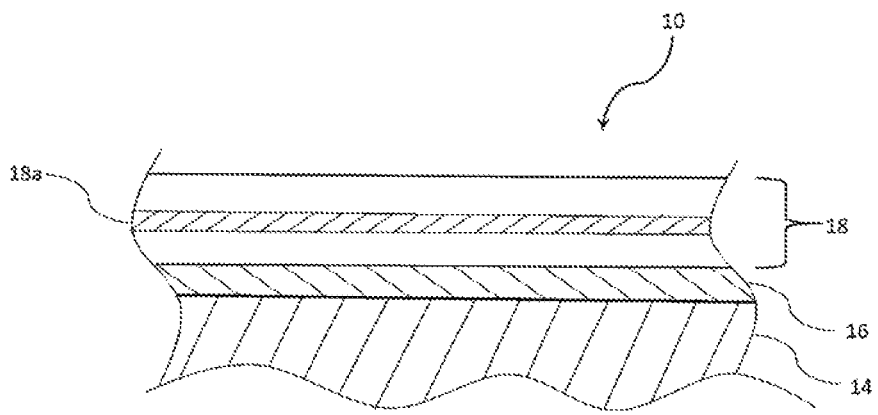

METHOD FOR MANUFACTURING MAGNETIC DISK, MAGNETIC DISK, AND MAGNETIC DISK PRECURSOR

CROSS-REFERENCE TO RELATED APPLICATIONS

This U.S. National stage application of International Patent Application No. PCT/JP2021/048744, filed on Dec. 28, 2021, which, in turn, claims priority to U.S. Provisional Patent Application No. 63/131,574, filed on Dec. 29, 2020. The entire contents of U.S. Provisional Patent Application No. 63/131,574 and International Patent Application No. PCT/JP2021/048744 are hereby incorporated herein by reference.

BACKGROUND

Field of the Invention

The present invention relates to a magnetic disk used in a hard disk drive device, a precursor thereof, and a method for manufacturing a magnetic disk.

Background Information

Following the expansion of cloud computing in recent years, many hard disk drive devices are used in data centers for a cloud in order to increase storage capacity.

In order to increase recording density, which is a means of increasing storage capacity, a heat-assisted magnetic recording system (referred to as "HAMR" hereinafter) and a microwave-assisted magnetic recording system (referred to as "MAMR" hereinafter) have been proposed as magnetic-disk recording systems.

HAMR and MAMR are systems with which a magnetic coercive force is temporarily weakened by applying heat or energy of microwaves or the like to a magnetic recording layer with a large magnetic coercive force, and information is written in the magnetic recording layer using a magnetic recording head by reversing the magnetization of the magnetic recording layer. Therefore, such systems are collectively referred to as energy-assisted magnetic recording systems (referred to as "EAMR" hereinafter).

A magnetic recording medium for heat-assisted recording having a structure in which a magnetic recording layer is laminated on a non-magnetic substrate, and a heat insulating layer is laminated on a layer above the magnetic recording layer is known as such a magnetic disk for EAMR (designed for EAMR) (JP 2010-153012A). The magnetic recording medium has a configuration in which a laminate includes at least a magnetic recording layer, a heat insulating layer, a carbon-based protection layer, and a lubricant layer on the non-magnetic substrate in the stated order. According to this magnetic recording medium, because the heat insulating layer is provided between the magnetic recording layer and the carbon-based protection layer, the lubricant layer and the protection layer that are present in layers above the heat insulating layer are inhibited from being heated by heat and energy of microwaves and the like applied to the magnetic recording layer during magnetic recording, thereby deterioration of properties of the lubricant layer and the protection layer can be suppressed, and a magnetic recording medium with increased durability and reliability can be provided.

SUMMARY

In order to produce a magnetic disk for EAMR, a magnetic film, which will become a magnetic recording layer, is formed on a substrate, the magnetic film is subjected to heat-treatment, and thus the magnetic film can be made into a magnetic recording layer optimal for EAMR. A magnetic material that exhibits a large magnetic coercive force regardless of having a small size is used for this magnetic recording layer. An FePt-based alloy or a CoPt-based alloy is used as a magnetic material of a magnetic film, which will become a magnetic recording layer, for example, and these magnetic films formed through sputtering or the like are subjected to heat treatment (high-temperature annealing), and thus a magnetic recording layer containing Fe—Pt or Co—Pt having a predetermined magnetic layer structure such as an $L1_0$ ordered structure (also referred to as an "$L1_0$ crystal structure") can be obtained. There is demand for such a magnetic recording layer having a high magnetic anisotropy constant Ku such as $10^7$ [erg/cm$^3$] or more.

However, in heat treatment (high-temperature annealing) for obtaining a magnetic layer structure, the magnetic film is heated at a high temperature of 600° C. or more, for example. Therefore, a substrate is also heated at a high temperature simultaneously with the magnetic film. In general, aluminum alloy substrates (e.g., substrates made of an Al—Mg alloy) and glass substrates are often used as substrates for a magnetic disk. However, many substrates that have been conventionally used have low heat resistance, and these low-heat resistant substrates tend to deform under heat treatment (high-temperature annealing) described above, and cannot be used as substrates for a magnetic disk for EAMR. Thus, there is a problem where the substrate for a magnetic disk for EAMR is limited to a substrate having high heat resistance.

In view of this, the present invention aims to provide a magnetic disk precursor that enables a conventionally-used substrate whose heat resistance is too low to withstand temperature conditions under which high-temperature annealing is performed when a magnetic disk is manufactured, to be used as a substrate for a magnetic disk, a magnetic disk that is a product thereof, and a method for manufacturing a magnetic disk.

An aspect of the present invention is a method for manufacturing a magnetic disk, the method including:
producing a magnetic disk precursor having a substrate, a magnetic film, and a heat insulating layer provided between the substrate and the magnetic film; and
increasing a magnetic anisotropy constant Ku of the magnetic film by performing heat treatment such that a temperature of the magnetic disk precursor on a surface side relative to the heat insulating layer is higher than a temperature of the magnetic disk precursor on the substrate side relative to the heat insulating layer.

It is preferable that the heat treatment is performed through irradiation with the laser beam such that a focal point of the laser beam is aligned with the magnetic film.

It is preferable that the heat treatment is performed through irradiation with the laser beam such that a focal point of the laser beam is aligned with the magnetic film.

It is preferable that the heat insulating layer contains a metal oxide having a thermal conductivity of 40 [W/(m·K)] or less as a main component.

Further, another aspect of the present invention is a magnetic disk including a substrate; a magnetic recording layer; and a heat insulating layer provided between the substrate and the magnetic recording layer.

It is preferable that a main component of the heat insulating layer has a thermal conductivity of 40 [W/(m·K)] or less.

It is preferable that a main component of the heat insulating layer is a metal oxide.

It is preferable that the magnetic recording layer has an $L1_0$ crystal structure.

Also, it is preferable that the magnetic disk has a plate thickness of 0.5 mm or less, and the heat insulating layer contains $SiO_2$ in an amount of 80% by weight or more and has a thickness of 5 nm or more.

Another aspect of the present invention is a magnetic disk precursor including a substrate; a magnetic film before being subjected to heat treatment, the magnetic film being to become a magnetic recording layer of a magnetic disk through the heat treatment; and a heat insulating layer provided between the substrate and the magnetic film.

It is preferable that a main component of the heat insulating layer has a thermal conductivity of 40 [W/(m·K)] or less.

It is preferable that a main component of the heat insulating layer is a metal oxide.

It is preferable that the magnetic recording layer contains an FePt-based alloy or a CoPt-based alloy.

According to the above-described magnetic disk, magnetic disk precursor, and method for manufacturing a magnetic disk, even though a substrate has low heat resistance, the substrate can be used as a substrate for a magnetic disk that can withstand heat treatment.

BRIEF DESCRIPTION OF THE DRAWINGS

FIG. 1 is an external perspective view of an example of a substrate of a magnetic disk for EAMR according to this embodiment.

FIG. 2 is a diagram showing an example of a layer structure formed on a main surface of the magnetic disk for EAMR according to this embodiment.

DETAILED DESCRIPTION OF THE EMBODIMENTS

Hereinafter, a magnetic disk, a magnetic disk precursor, and a method for manufacturing a magnetic disk according to the present invention will be described in detail. Although a magnetic disk for EAMR will be described as an example in an embodiment described below, a magnetic disk according to the present invention is not limited to a magnetic disk for EAMR, and may be a magnetic disk employing a conventional recording system in which information is written by reversing the magnetization of a magnetic recording layer without supplying heat or energy of microwaves or the like to the magnetic recording layer.

FIG. 1 is an external perspective view of an example of a substrate of a magnetic disk for EAMR (simply referred to as a "magnetic disk" hereinafter) according to an embodiment, and FIG. 2 is a diagram showing an example of a layer structure formed on a substrate of a magnetic disk according to an embodiment. As shown in FIG. 1, a magnetic disk 10 has a pair of main surfaces and has an annular shape. Specifically, the magnetic disk 10 has a circular outer circumferential shape, and is provided with a circular inner hole that is concentric with the circular shape of the outer circumferential shape, thus having a circular inner circumferential shape.

A multilayer laminate portion 18 (see FIG. 2) that includes a magnetic recording layer 18a for making the magnetic disk 10 function as a magnetic disk is formed on each of main surfaces 11p and 12p respectively located on two sides of the substrate 14 of the magnetic disk 10. As shown in FIG. 2, a heat insulating layer 16 is provided between the substrate 14 and the multilayer laminate portion 18 provided on the substrate 14. That is to say, the magnetic disk 10 includes the substrate 14, the magnetic recording layer 18a, and the heat insulating layer 16 provided between the substrate 14 and the magnetic recording layer 18a.

The substrate 14 is a substrate made of an Al—Mg alloy, for example. A plating film made of a Ni-based alloy is usually formed on a surface of the substrate made of an Al—Mg alloy, for example. Here, examples of the Ni-based alloy include Ni—P alloys and Ni—P—W alloys. The thickness of a plating film made of a Ni-based alloy on one main surface is 1 to 20 μm, for example. A "substrate made of an Al—Mg alloy" used in this specification refers to a substrate made of an Al—Mg alloy and having a Ni-based plating film on its surface, unless otherwise stated. It is also possible to use a glass substrate made of crystallized glass or amorphous glass instead of the substrate made of an Al—Mg alloy. As a result of the heat insulating layer 16 being provided between the substrate 14 and the magnetic recording layer 18a, it is possible to use, as the substrate 14, a substrate made of an Al—Mg alloy, which has low heat resistance and thus cannot withstand temperature conditions for conventional heat treatment (high-temperature annealing), a glass substrate having a glass transition point of 600° C. or less, and the like. Further, it is also possible to use, as the substrate 14, a glass plate having high heat resistance, a glass plate having a glass transition point of more than 600° C., for example. A substrate having low heat resistance, which could not be used conventionally, can be used as the substrate 14 without being subjected to restrictions on the temperature conditions for heat treatment.

An example of the multilayer laminate portion 18 will be described below, but the multilayer laminate portion 18 is not limited to the following example.

The multilayer laminate portion 18 has a structure in which an adhesion layer, a soft magnetic layer, a heat sink layer, a seed layer, an undercoat layer, the magnetic recording layer 18a, a protection layer, and a lubricant layer are laminated in the stated order from the substrate 14 side (or the heat insulating layer 16 side). Therefore, the heat insulating layer 16 is in contact with the adhesion layer. FIG. 2 only shows the magnetic recording layer 18a while the multilayer laminate portion 18 is shown in a simplified manner.

The adhesion layer increases adhesion between the heat sink layer and the heat insulating layer 16, which is a layer below the heat sink layer, and is provided as needed. An amorphous alloy material such as CrTi or NiTa is preferably used as the adhesion layer, for example. Note that another adhesion layer may be provided between the heat insulating layer 16 and the substrate 14.

The soft magnetic layer is a layer for temporarily forming a magnetic path during recording in order to allow the passage of strong magnetic flux in a direction perpendicular to the recording layer in a perpendicular magnetic recording system. It is possible to use, as a composition of the soft magnetic layer, a cobalt-based alloy such as CoTaZr, a Co—Fe-based alloy such as CoCrFeB or CoFeTaZr, or the like.

The heat sink layer quickly dissipates heat from the magnetic recording layer 18a heated as a result of the supply of energy during magnetic recording, and highly heat conductive metallic materials such as Cr, Ag, Al, Cu, W, and Mo are used. The heat sink layer is provided as needed. Note that, even if the heat sink layer is provided, heat supplied to the magnetic film is not sufficiently dissipated by the heat sink layer during high-temperature annealing by which the atomic arrangement in the magnetic film is made to have an ordered structure so as to form the magnetic recording layer 18a during production of a magnetic disk, and flows to the substrate 14, as a result of which the substrate 14 is likely to reach a high temperature. Therefore, the heat insulating layer 16 is provided. When the heat sink layer is provided, the heat insulating layer 16 is preferably provided between the heat sink layer and the substrate 14. As a result, it is possible to quickly dissipate heat from the magnetic recording layer 18a heated as a result of the supply of energy during magnetic recording while suppressing substrate deformation during high-temperature annealing performed on the magnetic film. The thermal conductivity of a material used in the heat sink layer is 100 [W/(m·K)] or more, for example. As a result of using such a material as a main component of the heat sink layer, it is possible to sufficiently obtain the above effects during recording of magnetic signals through energy assist and during high-temperature annealing performed on a magnetic film.

The seed layer cancels out the crystal orientation of layers below the seed layer, and orients the crystal orientation of the undercoat layer located above the seed layer in a predetermined direction. An alloy material such as CrTi, NiTa, or AlTi is used for the seed layer, for example.

The undercoat layer improves properties of the magnetic recording layer 18a by controlling the crystal particle size, crystal orientation, flatness, and the like of the magnetic recording layer 18a. The undercoat layer may be constituted by a single layer (e.g., MgO or Ru) or multiple layers. When the undercoat layer is constituted by multiple layers, a nitride undercoat layer (e.g., TaN, NbN, HfN, or AlN) and an oxide undercoat layer (e.g., MgO) can be included, for example. Note that, although MgO is an oxide, MgO has a thermal conductivity of more than 40 [W/(m·K)], and thus MgO is not preferable as a heat insulating layer in the present invention.

Also, a BCC undercoat layer may be further provided as a part of the undercoat layer. The BCC undercoat layer is a layer that controls the orientation of the magnetic recording layer 18a. The BCC undercoat layer contains Cr, Mo, Nb, Ta, V, or W, or contains Cr as a main component and at least one type of Mn, Mo, Ru, Ti, V, and W, and has a BCC structure and is oriented in (100), for example. Note that a "main component" used in this specification and claims refers to a substance (element, compound, or the like) whose content is 50% by weight or more, preferably 60% by weight or more, or 50 mol % or more, and preferably 60 mol % or more. Here, when a substance whose content is 50% by weight or 50 mol % or more is not present, the main component refers to a substance whose content is the highest.

The magnetic recording layer 18a is a layer that contains, as the main component, an alloy having an $L1_0$ ordered structure, for example. The magnetic recording layer 18a is preferably formed using magnetic particles with several nanometers separated by a grain boundary segregation material. However, if the volume of the magnetic particles is excessively small, written magnetic signals are likely to be affected by heat and become unstable. Thus, the magnetic recording layer 18a having a high magnetic anisotropy constant Ku and an $L1_0$ ordered structure is used. The magnetic recording layer 18a contains an FePt-based alloy or a CoPt-based alloy as the main component, for example. Further, the magnetic recording layer 18a may contain, as an additive, at least one type of oxide or element selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, and C. When these are added, the magnetic recording layer 18a tends to have a granular structure, and fine magnetic particles can be obtained, and the S/N ratio (signal/noise ratio) properties of a magnetic disk for EAMR can be improved. The thickness of the magnetic recording layer 18a may be 5 to 20 nm, for example.

The protection layer is made of a material with high mechanical durability and heat resistance, and protects portions present in a layer below the protection layer in the multilayer laminate portion 18. The protection layer is a single carbon layer or multiple carbon layers, for example. DLC (diamond-like carbon) to which hydrogen, nitrogen, or a metal is added is preferably used as the carbon layer. The carbon layer is formed using a CVD method, or an ion beam method, for example.

The lubricant layer is provided in order to improve lubricity and abrasion resistance when a magnetic head and a surface of the magnetic disk slide against each other, and perfluoropolyether is used, for example.

The heat insulating layer 16 is provided between the magnetic recording layer 18a and the substrate 14. The heat insulating layer 16 is more preferably provided between the multilayer laminate portion 18 and the substrate 14. A material having a thermal conductivity of 40 [W/(m·K)] or less is preferably used for the heat insulating layer 16. The thermal conductivity of a material used for the heat insulating layer 16 is more preferably 30 [W/(m·K)] or less, even more preferably 20 [W/(m·K)] or less, and further preferably 10 [W/(m·K)] or less. By using such a material having low thermal conductivity as the main component of the heat insulating layer 16, it is possible to suitably suppress conduction of heat for heat treating the magnetic film to the substrate, and as a result, suppress deformation of the substrate caused by heat. Such a heat insulating layer 16 preferably contains a metal oxide such as $Al_2O_3$ or $SiO_2$ as the main component. According to various pieces of literature, the thermal conductivity (unit: W/(m·K)) is, for example, 21 for $Al_2O_3$, 1.38 (300 K) for $SiO_2$, 8.4 (300K) for polycrystalline $TiO_2$, and 4.0 for $ZrO_2$ (zirconia). From the viewpoint of improving heat insulating effects, a material for forming the heat insulating layer 16 preferably has an amorphous structure. The heat insulating layer 16 preferably has a thickness of 2 nm or more. When the thickness of the heat insulating layer 16 is less than 2 nm, the heat insulating layer 16 may be formed in the form of islands with gaps therebetween, resulting in insufficient heat insulating effects. Further, once the heat insulating layer 16 is formed as a "layer", heat insulating effects increase as the thickness thereof increases. Therefore, the thickness of the heat insulating layer 16 is more preferably 15 nm or more, even more preferably 20 nm or more, and further preferably 50 nm or more. The thickness of the heat insulating layer 16 is preferably 20% or more of the thickness of the magnetic recording layer 18a. Although there is no particular limit on the upper limit of the thickness of the heat insulating layer 16, from the viewpoint of productivity, the thickness of the heat insulating layer 16 may be 500 nm or less, for example.

From the above viewpoint, preferable examples of a configuration of the heat insulating layer 16 will be described below. When $Al_2O_3$ is used as the main component of the heat insulating layer 16, the heat insulating layer 16 contains $Al_2O_3$ in an amount of 80% by weight or more, preferably has a thickness of 10 nm or more, and more preferably has a thickness of 20 nm or more. When $SiO_2$ is used as the main component of the heat insulating layer 16, the heat insulating layer 16 contains $SiO_2$ in an amount of 80% by weight or more, preferably has a thickness of 5 nm or more, more preferably has a thickness of 10 nm or more, and even more preferably has a thickness of 15 nm or more.

The heat insulating layer 16 can be formed using various film forming techniques such as sputtering, CVD, and electron beam evaporation, and film quality modification techniques such as ion implantation.

On the other hand, the total thickness of a portion of the laminate portion 18 below the magnetic film (on the substrate side) is preferably at least 30 nm or more, and more preferably 40 nm or more. When the total thickness is less than 30 nm and the heat insulating layer contains an oxide as the main component, the crystal orientation of the magnetic film cannot be improved, and the Ku of the magnetic recording layer may decrease after heat treatment.

The magnetic recording layer 18a is a layer having a portion in which a magnetic film formed through sputtering or the like is heat-treated (annealed at a high temperature) so that the atomic arrangement has an ordered structure. The magnetic recording layer 18a may be a layer having a high magnetic anisotropy constant Ku, for example, $10^7$ [erg/cm$^3$] or more, and preferably $2 \times 10^7$ [erg/cm$^3$] or more. When the magnetic film is a layer made of an FePt-based alloy or a CoPt-based alloy, it is possible to form the magnetic recording layer 18a having an $L1_0$ ordered structure. Note that, the ordered structure of an alloy is not limited to the $L1_0$ ordered structure, and may be another ordered structure.

With a conventional technique, in heat treatment (high-temperature annealing) for forming an ordered structure, the temperature of the substrate 14 is also increased simultaneously, and often reaches 600° C. or more, for example. In this case, a substrate made of an Al—Mg alloy has a low heat resistant temperature of about 300° C., and cannot be used as a substrate for the magnetic disk 10 having the magnetic recording layer 18a with a high Ku. To address this, by providing the heat insulating layer 16 between the substrate 14 and a magnetic film prior to becoming the magnetic recording layer 18a, even if heat treatment is performed under temperature conditions of the heat treatment (high-temperature annealing), the temperature of the substrate 14 is unlikely to reach a high temperature of 600° C. or more, for example, and deformation of the substrate 14 and deterioration of flatness thereof are suppressed. Thus, a low heat resistant substrate, which has conventionally been difficult to use, such as a substrate made of an Al—Mg alloy, can be used as the substrate 14.

Note that the position at which the heat insulating layer 16 is provided is located between the substrate 14 and an adhesion layer present in the multilayer laminate portion 18 in the above-described embodiment, but is not necessarily limited to this position. The position at which the heat insulating layer 16 is provided need only be located at least between the magnetic recording layer 18a and the substrate 14, provided that the flatness of the substrate 14 is not deteriorated by high-temperature annealing. Note that the wording "flatness does not deteriorate" used in this specification specifically indicates that the amount of increase in the flatness of the substrate 14 through heat treatment is 30 µm or less, for example. In other words, the difference between the flatness of the substrate 14 after the heat treatment and the flatness of the substrate 14 before heat treatment is 30 µm or less. The amount of increase (or difference) in the flatness of the substrate is preferably as small as possible, and more preferably 10 µm or less. The term "flatness" in this specification refers to a PV (Peak to Valley) value on a predetermined plane.

Therefore, a magnetic disk precursor for EAMR before producing a magnetic disk for EAMR, i.e., a magnetic disk precursor for EAMR before heat treatment, includes the substrate 14, a magnetic film before being subjected to heat treatment, the magnetic film being to become the magnetic recording layer 18a for an energy-assisted system by performing heat treatment thereon, and a heat insulating layer provided between the substrate 14 and the magnetic film.

Although there is no particular limitation on the size of the magnetic disk 10 shown in FIG. 1, the size of the magnetic disk 10 corresponds to the size of a magnetic disk having a nominal diameter of 2.5 inches or 3.5 inches, for example. In the case of a magnetic disk having a nominal diameter of 2.5 inches, the outer diameter (diameter) thereof is 55 to 70 mm, for example, the outer diameter (diameter) is 65 mm or 67 mm, the diameter of an inner hole is 20 mm, and the plate thickness is 0.3 to 1.3 mm. In the case of a magnetic disk having a nominal diameter of 3.5 inches, the outer diameter thereof is 85 to 100 mm, for example, the outer diameter is 95 mm or 97 mm, the diameter of an inner hole is 25 mm, and the plate thickness is 0.3 to 1.8 mm. Note that, in particular, when the plate thickness is 0.5 mm or less, the flatness of a substrate tends to deteriorate during heat treatment, but deterioration of the flatness can be suppressed by providing the heat insulating layer 16 according to the present invention. Therefore, it is preferable to apply the present invention to a substrate having a plate thickness of 0.5 mm or less. Note that numerical values of the diameter and the plate thickness regarding the dimensions of the above magnetic disk are all nominal values. That is, these values may include dimensional variations of several tens of micrometers in the positive and negative directions about the nominal value during mass production.

With such a method for manufacturing the magnetic disk 10, the above-described precursor is produced, and magnetic films of the precursor on the surface side of the main surfaces 11p and 12p relative to the heat insulating layer 16 are subjected to heat treatment, and thereby the magnetic anisotropy constant Ku of the magnetic films is increased. As a result, the magnetic film can be formed into a magnetic recording layer having a high Ku that is optimal as the energy-assisted magnetic recording layer 18a. Note that heat treatment can be performed any time after a heat insulating layer is formed. After a portion spanning from the heat insulating layer to the magnetic film is formed, the magnetic film may be subjected to heat treatment before a protection layer is formed, for example. Also, heat treatment may be performed while the magnetic film is being formed.

Although there is no particular limitation on a method for performing heat treatment (high-temperature annealing) on a magnetic film, heat treatment is preferably performed by irradiating the magnetic film (inside) with a laser beam from the surface side of a substrate. In particular, when a protection layer and the like are present on the magnetic film, the magnetic film can be efficiently heated by irradiating the magnetic film with the laser beam from the surface side and causing the laser beam to converge at an inner portion (depth) of the magnetic film (in other words, by aligning the focal point of the laser beam with the position of the magnetic film), and thus the magnetic film can be annealed. Such laser beam irradiation can be easily performed on an entire main surface of the substrate by scanning the substrate with the laser beam along a circumferential direction of the substrate 14 while rotating the substrate 14. Also, it is preferable to spirally scan the substrate with a laser beam because the entire main surface of the substrate can be more efficiently and uniformly heat-treated. Further, a substrate may be scanned in a spiral manner, using a laser beam adjusted to have a spot diameter of about 0.5 to 5.0 mm on a main surface of the substrate. As a method for spirally irradiating a substrate with a laser beam, the substrate may be fixed, and the spot of the laser beam may be moved. In addition, by using a laser beam with an irradiation spot diameter that is equal to or larger than the diameter of the substrate, heat treatment may be performed without rotating the substrate.

As a result of performing heat treatment on the magnetic disk precursor on the surface side of the magnetic disk precursor relative to the heat insulating layer (i.e., performing heat treatment targeting the surface side relative to the heat insulating layer) in this manner, it is possible to increase the magnetic anisotropy constant Ku of the magnetic film, and to suppress deformation of the substrate caused by heat by suppressing an increase in the temperature of the magnetic disk precursor on the substrate side (inner side) relative to the heat insulating layer.

In other words, as a result of performing heat treatment such that the temperature of the magnetic disk precursor on the surface side of the magnetic disk precursor relative to the heat insulating layer is higher than the temperature thereof on the substrate side relative to the heat insulating layer, it is possible to increase the magnetic anisotropy constant Ku of the magnetic film, and to suppress deformation of the substrate caused by heat by suppressing an increase in the temperature of the magnetic disk precursor on the substrate side (inner side) relative to the heat insulating layer.

It is sufficient to select a laser beam for heating from a $CO_2$ laser, a YAG laser, a fiber laser, a semiconductor laser, and the like, for example, in consideration of a material of a substrate surface.

Note that the substrate may be heated using a method employing heat radiation using a lamp heater or the like, in addition to the above-described methods. The heat insulating layer 16 can block or reduce the flow of heat from the heated magnetic film to the substrate 14.

Examples

Two types of magnetic disk precursors for EAMR were prepared using, as the substrate 14, a substrate made of an Al—Mg alloy having a NiP alloy plating layer on its surface, and a glass substrate having a glass transition point Tg of 500° C. That is to say, the heat insulating layer 16 made of $Al_2O_3$ was formed through sputtering to have a thickness of 20 nm on a surface of the substrate 14, and then the above-described laminate portion 18 was successively formed through a predetermined film formation process. A magnetic film with a thickness of about 10 nm was formed by sputtering an FePt-based alloy. The size of the precursor corresponded to the nominal 3.5-inch size of an EAMR magnetic disk (outer diameter: 95 mm, inner hole diameter: 25 mm, and plate thickness: 0.635 mm).

A magnetic film on a main surface of these precursors was irradiated with a laser beam set to focus on the magnetic film. The magnetic film of the main surface was subjected to heat treatment (high-temperature annealing) by spirally scanning the substrate 14 such that the laser irradiation position was moved along the circumferential direction of the substrate 14 by rotating the substrate 14 while irradiating the substrate 14 with the laser beam.

The magnetic film, which was subjected to heat treatment in this manner, became a layer having an $L1_0$ ordered Fe—Pt structure, i.e., the magnetic recording layer 18a. The amount of change in the flatness of each substrate 14 before and after heat treatment was 10 µm or less. In contrast, when no heat insulating layer 16 was provided, the amount of change in the flatness of a substrate before and after heat treatment was larger than 30 µm. The flatness was measured using Opti-Flat (an optical interferometric surface profile measurement device).

Then, two types of magnetic disk precursors for EAMR were prepared using a substrate made of an Al—Mg alloy and a glass substrate as the substrate 14 in the same manner as in the Example above, except that the heat insulating layer 16 was made of $SiO_2$ with a thickness of 15 nm and the substrate 14 had a thickness of 0.500 mm, and heat treatment was performed on the magnetic films. As a result, the magnetic film, which was subjected to heat treatment, became the magnetic recording layer 18a having an $L1_0$ ordered Fe—Pt structure, and the amount of change in the flatness of each substrate 14 before and after the heat treatment was 30 µm or less.

It was confirmed through these experiments that the heat insulating layer 16 was effective in improving the heat resistance of the substrate 14 during the heat treatment.

Although a magnetic disk, a magnetic disk precursor, and a method for manufacturing a magnetic disk according to the present invention have been described above in detail, the present invention is not limited to the above embodiment, and it goes without saying that various modifications and changes can be made within a scope not departing from the gist of the present invention.

The invention claimed is:

1. A method for manufacturing a magnetic disk for perpendicular magnetic recording, the method comprising:
   producing a magnetic disk precursor having
      an annular-shaped substrate,
      a magnetic film that overlays the substate and is a magnetic recording layer,
      a soft magnetic layer that overlays the substate, and
      a heat insulating layer provided between the substrate and the magnetic film; and
   performing heat treatment on an entirety of a main surface of the magnetic disk precursor by spirally irradiating the entirety of the main surface of the magnetic disk precursor with a laser beam, and
   the heat treatment being performed for increasing a magnetic anisotropy constant Ku of the magnetic film.

2. The method for manufacturing a magnetic disk for perpendicular magnetic recording according to claim 1, wherein the heat treatment is performed through irradiation with the laser beam such that a focal point of the laser beam is aligned with the magnetic film.

3. The method for manufacturing a magnetic disk for perpendicular magnetic recording according to claim 1, wherein the heat insulating layer contains a metal oxide having a thermal conductivity of 40 [W/(m·K)] or less as a main component.

4. The method for manufacturing a magnetic disk for perpendicular magnetic recording according to claim 1, wherein an amount of increase in a flatness of the substrate through the heat treatment is 30 µm or less.

5. The method for manufacturing a magnetic disk for perpendicular magnetic recording according to claim 1, wherein the magnetic disk precursor is produced such that the magnetic disk precursor further has a heat sink layer between the substrate and the magnetic film, and the heat insulating layer is arranged between the substrate and the heat sink layer.

6. The method for manufacturing a magnetic disk for perpendicular magnetic recording according to claim 5, wherein a thermal conductivity of a material of the heat sink layer is 100 [W/(m·K)] or more.

* * * * *